United States Patent [19]

Slusky

[11] Patent Number: 5,267,304
[45] Date of Patent: Nov. 30, 1993

[54] DIRECTORY ASSISTANCE SYSTEM

[75] Inventor: Ronald D. Slusky, Highland Park, N.J.

[73] Assignee: AT&T Bell Laboratories, Murray Hill, N.J.

[21] Appl. No.: 680,862

[22] Filed: Apr. 5, 1991

[51] Int. Cl.⁵ .............. H04M 3/42; H04M 3/00; H04M 1/56
[52] U.S. Cl. ................. 379/201; 379/213; 379/255; 379/142; 379/84
[58] Field of Search .............. 379/88, 89, 142, 201, 379/213, 255, 357

[56] References Cited

U.S. PATENT DOCUMENTS 4,817,129 3/1989 Riskin .................................. 379/97
4,979,206 12/1990 Padden et al. ..................... 379/88

OTHER PUBLICATIONS

Beyond ISDN Theory by Andrew Waite, Inbound-/Outbound Magazine Dec. 1989.

Primary Examiner—James L. Dwyer
Assistant Examiner—Fan Tsang
Attorney, Agent, or Firm—Ronald D. Slusky; Gerard A. De Blasi

[57] ABSTRACT

In an automated directory assistance system, the telephone number of the calling party is used to determine whether or not the outgoing "spoken" message will include the area code of the sought-after number.

2 Claims, 1 Drawing Sheet

DIRECTORY ASSISTANCE SYSTEM

BACKGROUND OF THE INVENTION

The present invention relates to automated directory assistance service, as provided by telephone companies to their subscribers.

Modern day directory assistance service is provided with the aid of a computer. The caller indicates to a directory assistance operator the name of the party whose telephone number is desired. The operator, in turn, consults an electronic database and, upon finding the desired number, enables the system to deliver a "spoken" audio message which includes the sought-after telephone number. This may be carried out by, for example, electronically assembling stored representations of spoken digits, words and/or phrases and then sending them out over the telephone line. As an alternative, speech synthesis circuitry can be used to create the "spoken" message.

Many such systems include the area code of the delivered telephone number. This is particularly useful in situations where the caller has dialed the standard local directory assistance number, such as "411", but the number that is ultimately delivered by the directory assistance system has an area code which is different from that of the caller's telephone.

In this regard, consider, for example, the situation in which a subset of the telephone numbers in a particular area code has been assigned a brand new area code but, for a transition period, the old area code can still be used by callers. This is currently the situation in Central New Jersey, in which a large number of the telephone numbers in area code "201" have been assigned to area code "908". It is desirable to allow persons in the "908" area to be able, during the transition period, to obtain from directory assistance the numbers of telephones that will continue to be in the "201" area by dialing "411", rather than by having to dial the "long distance" directory assistance number 201-555-1212. However, since the capability of dialing all of the original "201" numbers without using the area code is only for a transitional time period, it is desirable for the directory assistance system to indicate whether the number being sought is a "908" number or a number which will continue to be a "201" number.

SUMMARY OF THE INVENTION

I have, however, recognized a problem that occurs in these situations. Specifically, the caller often knows beyond any doubt what the area code of the desired telephone number is—it may be someone down the block—and given today's modern pace, the caller becomes impatient waiting for the slow, clearly articulated words "Area—Code—nine—oh—eight" to be spoken by the system before the desired seven-digit telephone number can be spoken.

In accordance with the invention, the directory assistance system is provided with the capability of receiving and examining the telephone number of the calling party and selectively including or excluding the area code from the message delivered to the caller as a function of information derived from that number and the sought-after number. For example, the system may omit or include the area code of the sought-after number as a function of whether the calling number and the sought-after number have the same area code or a different area code, respectively. Or it may omit the area code if the two numbers are within the same local calling (i.e., non-toll-call) area or, perhaps, the same local exchange. As another alternative, the area code can be omitted if the calling number and the sought-after number are determined to be within the same municipality.

DETAILED DESCRIPTION

Figure 1:
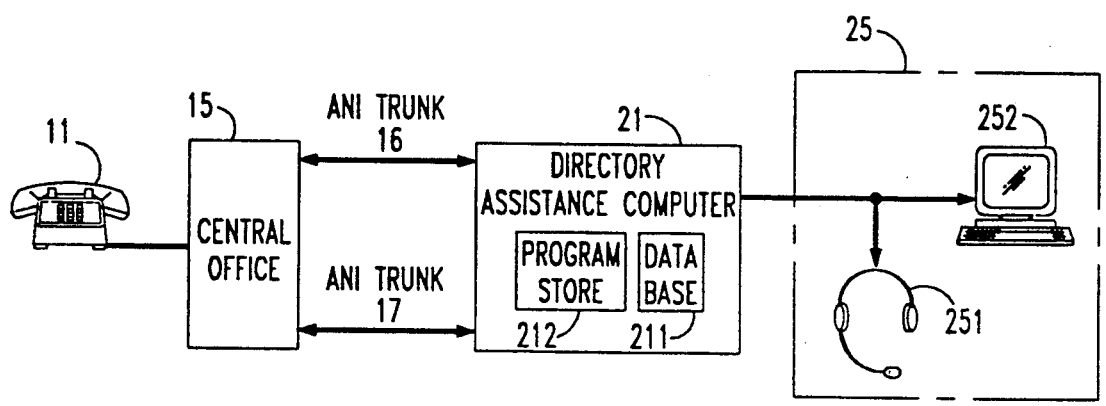
FIG. 1 is a block diagram of a telephone system embodying the principles of the invention.

The system of FIG. 1 shows a subscriber telephone 11 connected to a telephone central office 15. Extending out from office 15 are a number of lines, trunks, etc., including ANI trunks 16 and 17, extending to directory assistance computer 21 located on premises which are typically at a distance from office 15. ANI trunks are each capable of supporting a number of telephone calls so that a number of subscribers can be in communication with computer 21 simultaneously. Additionally, it will be appreciated that telephone calls may originate from telephones not directly connected to office 15 but, rather, from telephones connected to other central offices which are, in turn, connected to office 15 via, for example, various telephone trunks (not shown).

Trunks 16 and 17 are denoted ANI trunks because they are capable of delivering to computer 21 the telephone number associated with a calling telephone—the acronym "ANI" standing for "automatic number identification".

Connected to computer 21 are a plurality of operator stations, such as station 25. Communication line 24 between computer 21 and station 25 provides voice communication between the operator and the calling party and data communication between the operator and the computer. Initially, the operator speaks to the calling party using headset 251 and looks up the desired telephone number using terminal 252 which is connected to database 211 within the computer. When the operator has found the desired number in the database, he/she depresses a particular key on the terminal keyboard, causing computer 21 to deliver a synthesized or stored voice message back to the caller giving the sought-after number.

Figure 2:
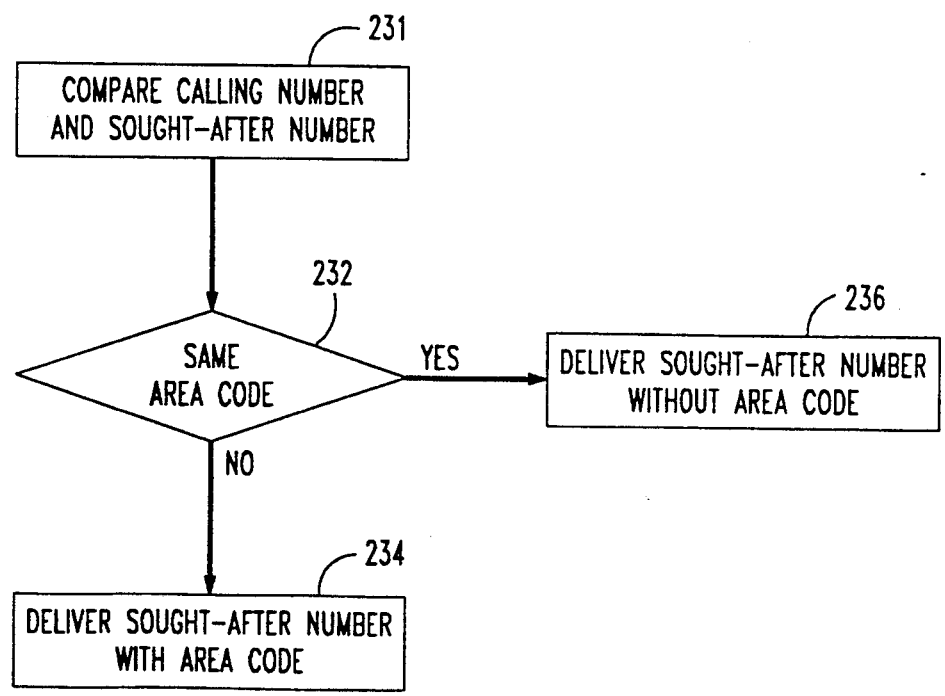
FIG. 2 is a flowchart depicting the steps illustratively carried out by a directory assistance computer within the system of FIG. 1 in implementing the invention.

The flowchart of FIG. 2 shows those steps carried out by the software within computer 21 that are germane to the present invention, that software being held in program store 212. In particular, the software examines the calling number and the sought-after number at step 231. It then compares their area codes at step 232. If the area codes are not the same, the sought-after number is delivered with the area code included, as indicated at 234. If, however, they are the same, then, in accordance with the invention, the sought-after number is delivered without the area code included, as indicated at 236.

The capabilities of the system in carrying out the invention are readily achieved by straightforward modification of the software that operates known prior art automated directory assistance systems.

The foregoing merely illustrates the principles of the invention. In particular, any desired criterion beyond those described herein can be used to determine, responsive to the telephone number of the incoming call, whether or not to include the area code in the "spoken" message.

I claim:

1. A method for use in an automated directory assistance system of the type in which calls are routed to the directory assistance system, via a telephone system, from a calling party desiring to learn a sought-after telephone number, said method comprising the steps of receiving in the directory assistance system the telephone number of the calling party from the telephone system, and delivering to the calling party a computer-generated audio message which gives said sought-after telephone number, said delivering step including the step of selectively including the area code of the sought-after number in said message in response to information derived from said received telephone number and said sought-after telephone number.

2. The invention of claim 1 wherein said area code is included in said message only if the area codes of said received number and said sought-after number are different.

* * * * *